Patented Sept. 16, 1941

2,256,444

UNITED STATES PATENT OFFICE 2,256,444

MALEIC ANHYDRIDE-POLYHYDRIC ALCOHOL-NATURAL RESIN REACTION PRODUCTS

Israel Rosenblum, New York, N. Y.

No Drawing. Application November 28, 1938, Serial No. 242,854

31 Claims. (Cl. 260—13)

The present invention relates to the production of synthetic resins of the soluble type suitable for the manufacture of lacquers, varnishes and other coating compositions.

It is the general object of the invention to produce a durable and resistant resin having a high melting point and characterized particularly by compatibility with nitrocellulose lacquers, and further to produce a resin capable of yielding a tough, transparent, flexible, water-proof, and adherent film when combined with a suitable vehicle.

More specifically, it is an object of the invention to provide an improved type of resin prepared either entirely or in part from a polyhydric alcohol, such as glycerol, maleic acid and a natural resin having conjugated double bonds, preferably rosin, the latter being used either alone or mixed with a phenol-aldehyde condensate.

It is known that on heating glycerol with approximately the equivalent amount of maleic acid, condensation occurs rapidly and that after a certain period of condensation the mass is converted almost instantaneously into an infusible gel. This resinous but not yet gelled product cannot be made to yield a useful material for coating compositions on heating with, for example, rosin. Thus, when 2 mols of glycerol and 3 mols of maleic anhydride (equivalent amounts) are heated to resinification, it is very difficult to control the reaction and the mass gels in a short time even when heated to only 150° C. Also, even after heating for about 1½ hours at 150° C. the acid number is still high, viz. 260. This product can no longer be taken up by rosin even when heated therewith to 230° C; in fact, if the heating at 150° C. is continued, the glycerol-maleic condensate gels during the next half hour. For this reason it has been suggested that the glycerol, maleic acid and rosin be heated simultaneously, the rosin thus acting as a flux and retarding or preventing the conversion of the mixture into the insoluble, infusible state.

For a number of reasons it is more desirable to prepare first an initial condensate of the glycerol and maleic acid, that is, in the substantial absence of rosin, prior to combination with the rosin. Thus, aside from greater convenience in manufacturing operations on a large scale, the initial condensation of the glycerol and maleic acid has the advantage that the product can be combined at will either with rosin alone or rosin and a phenol-aldehyde or other synthetic resin. For many purposes, it is desirable to incorporate a large proportion of maleic acid in the resin as the maleic acid imparts to the product a higher degree of solvent release when incorporated in a nitrocellulose lacquer, and yields also a lighter color and greater color permanence in the product. In view of the fact, however, that maleic acid and glycerol produce a rapidly gelling condensate on heating, as above stated, the production of glycerol-maleic-rosin resins, and of combinations of these resins with other synthetic resins, especially when the proportion of maleic acid was high, has been rather difficult and, according to certain known procedures, impossible.

I have found that under certain conditions, which I have determined, a "base" of glycerol and maleic acid can conveniently be manufactured practically without danger of gelling, and this base subsequently reacted with rosin, phenol-formaldehyde-rosin condensates and other synthetic resins. I have found that resins of superior properties may be prepared from glycerol, maleic acid and rosin if the glycerol is first reacted with the maleic acid and is employed in quantity considerably in excess of the equivalent amount with reference to the maleic acid up to approximately the amount equivalent to both the maleic acid and rosin, to produce the partial ester or esters, or the initial condensate of glycerol and maleic acid. By heating the maleic acid with considerably more than the equivalent abount of glycerol, the reaction can be conducted with great ease and without danger of conversion of the mass to the infusible state; in fact, when the excess of glycerol is rather large, the mixture becomes practically incapable of hardening. This reaction product, containing excess glycerol, is then reacted with an amount of rosin or rosin-containing material approximately sufficient to convert it into the substantially neutral condition.

The procedure just described has the advantage that no foreign material which might deleteriously affect the properties of the final product and no real excess of glycerol need be employed for, as I have found, the glycerol needed for the esterification of the subsequently added rosin is, in general, sufficient to provide the temporary excess during the initial reaction with the maleic acid. The greater this excess of glycerol is during the condensation with the maleic acid the safer it is to prepare the base and continue the condensation until a relatively low acid number is reached, much lower than when equivalent amounts of glycerol and maleic acid are employed; the condensate remaining compatible or reactive with rosin in spite of the fact that the reaction has been driven to a higher degree.

The amount of glycerol necessary for neutralizing rosin is about 10% by weight of the latter, but in the case of maleic anhydride it is about 63%. For resins which are to contain, say, 5% of maleic anhydride based on the weight of the rosin, a very large excess of glycerol can be present on initial reaction with the maleic anhydride if the full amount corresponding to both the maleic anhydride and the rosin is employed.

Thus, in the case of a resin containing 5% of maleic anhydride (based on the rosin) 100 parts of rosin will require 10 parts of glycerol, while the 5 parts of maleic anhydride will need 3.15 parts of glycerol for their neutralization. The ratio of the materials in the first stage of the process, will thus be 5 parts of maleic anhydride to 13.15 parts of glycerol, or 1:2.63. Expressed molecularly this ratio becomes 1:2.80. With this large excess of glycerol, which molecularly is 320% (1 mol of maleic anhydride being equivalent to ⅔ mol of glycerol), the initial condensate can be heated as high as 200° C. and the base can accordingly be prepared in a short time, say 1 to 2 hours, and a product with a low acid number obtained without danger of gelling. This condensate can then be reacted with rosin at temperatures of 230–250° C. with complete safety. In fact, it is almost impossible to spoil such a base, as it can be heated for as much as twelve hours at 200° C. until the acid number is only about 15 or less and will still be in the fusible and rosin-reactive condition.

With increasing proportions of maleic acid, the relative excess of glycerol (i. e. the amount corresponding to the rosin) becomes rapidly smaller, assuming that the glycerol is to be approximately equivalent to the maleic acid (or anhydride) and the rosin. Thus, in the case of a product containing 10% of maleic anhydride based on the rosin, 10 parts of glycerol will be required for the 100 parts of rosin and 6.3 parts for the 10 parts of maleic anhydride. The ratio of maleic anhydride to glycerol by weight is in this case 1:1.63. Expressed molecularly, this amounts to 1 mol of maleic anhydride to 1.74 mols of glycerol, the excess of glycerol being only 160% over the theoretical. Although the proportion of maleic anhydride is still relatively small, this base, in spite of the still considerable excess of glycerol cannot be brought to an advanced stage of reaction, say to a condition in which the acid number is less than half of the original mixture, with safety if heated to about 200° C. Either the base itself would begin to gel under these conditions, or gelling will occur during the subsequent heating with rosin when a temperature of 230°–250° C. has to be employed.

I have, however, found that with the proportions just described, the base can be safely prepared at a temperature of about 150° C. Thus, when

| | | Grams |
|---|---|---|
| Maleic anhydride | (3 mols) | 294 |
| Glycerol | (5.2 mols) | 478 | were heated at 150° C. for 1½ hours, the mixture bodied considerably and the acid number fell to 142, as compared with the original acid number of 430. This base is now ready for combination with rosin, although it can safely be heated for several hours longer at 150° C., the acid number then falling to about 70 or below, the resin remaining reactive with rosin.

With still higher maleic anhydride content, the excess of glycerol that can be employed in the initial condensation step drops still more and the glycerol-maleic base cannot safely be prepared even at temperatures of the order of only about 150° C. if the acid number is to be considerably reduced, that is, if a considerable degree of reaction between the glycerol and the maleic anhydride is to be obtained. Thus, in a resin in which the maleic anhydride content is to be 14% of the rosin, there can be heated with the 14 parts of maleic anhydride the 8.8 parts of glycerol required to neutralize the same plus the 10 parts of glycerol required to neutralize the 100 parts of rosin. The proportion of maleic anhydride to glycerol is accordingly 14:18.8 or 1:1.34. Molecularly, this amounts to 1 mol of maleic anhydride to 1.43 mols of glycerol, and since ⅔ mol of glycerol are equivalent to 1 mol of maleic anhydride, the theoretical excess mol of glycerol amounts to only 115%. With this relatively low excess of glycerol it is difficult to obtain a reaction product of greatly reduced acid number without danger of gelling.

I have, however, found in a further development of the invention, that with the just mentioned proportion of maleic anhydride, and even with considerably higher proportions, heating with the glycerol can be safely conducted in the neighborhood of 150° C. if there is added to the reaction mixture a quantity of a higher aliphatic alcohol, preferably butyl alcohol. A mixture containing this alcohol can be heated under reflux for much longer periods of time than in the absence of the alcohol without danger of gelling or of rendering the product incompatible with rosin. The butyl alcohol appears to have no permanent effect on the resin, as practically all of the alcohol is expelled by the time that the final product is obtained. Any intermediate butyl alcohol compounds that might be formed, such as butyl maleate or mixed maleic acid esters of glycerol and butyl alcohol, are apparently decomposed by the rosin at the higher temperatures of reaction with such material. In place of butyl alcohol, other volatile monohydric aliphatic alcohols having a boiling point high enough to permit a temperature of about 150° C. to be conveniently employed, if necessary, with reflux, but yet sufficiently volatile to be substantially completely removed on heating to 230–240° C. can be employed. Thus, amyl alcohol (boiling point about 135° C.), octyl alcohol (boiling point 180° C.) can replace the butyl alcohol in whole or in part.

I have found, further, that in the presence of the butyl or equivalent alcohol, a highly reacted condensation product can be obtained without danger of gelling, even when only 2 mols of glycerol are employed to each 3 mols of maleic anhydride, that is, when the glycerol is not in excess.

The initial glycerol-maleic condensate prepared in accordance with the present invention can be reacted not only with rosin but with various synthetic compositions containing rosin. Among the latter may be mentioned different types of phenol-aldehyde resins, either produced in the presence of rosin or reacted, after their initial condensation, with rosin. Of particular advantage are phenolic resins produced in the presence of sufficient aqueous alkali to keep the initial condensation product in solution, followed by acidification and separation of a condensate which is still soluble in organic solvents. Thus, phenolic resins produced in accordance with the process described in my copending application Ser. No. 102,331 filed September 24, 1936, with the aid of alkali as catalyst, as described by way of illustration in Examples 9 and 10 hereinbelow, may be employed after a larger proportion of rosin (compared to the phenol-aldehyde condensate) has been incorporated therein. These complex phenol-aldehyde-rosin-glycerol-maleic anhydride resins can, in general, be employed in any practical proportions in oil varnishes, but the proportion in which they may be employed in nitrocellulose lacquers will depend upon the nature and quantity of the phenol, the amount of maleic anhydride and to some extent upon the manner of the phenolic condensation. Where the product is made for use both in lacquers and in varnishes, the proportions of the constituents will, in general, be determined by the compatibility of the products with nitrocellulose lacquers. Thus, in the case of a butyl phenolformaldehyde resin, a maximum of about 8% can be employed with a glycerol-maleic anhydride-rosin condensate containing 6% of maleic anhydride based on the rosin; while in the case of ordinary phenol (carbolic acid) a maximum of about 4½%, and in the case of cresylic acids a maximum of about 8% can be used with such maleic resin. A reactive resin obtained by condensing butyl phenol and formaldehyde in the proportions of 1 mol of the former to about 2 mols of the latter with enough aqueous alkali to keep the condensate in solution, with or without a quantity of dipentene, followed by acidification and distillation of the separated resin until it is brittle at room temperature, can be employed up to about 12% by weight of the just mentioned glycerol-maleic-rosin condensate. If the content of maleic anhydride is higher, more phenol-formaldehyde resin can be used for the production of a resin compatible with nitrocellulose lacquers up to the point at which the resin becomes infusible. Both the phenolic resin and the maleic anhydride resin raise the melting point of the lacquer resin.

The phenol may be either ordinary phenol or higher phenols, including the homologues of phenol, or mixtures thereof. As examples may be mentioned cresylic acid, xylenols, butyl, amyl and octyl phenols, hydroxydiphenyl and condensation products of phenols with aliphatic or aromatic ketones, including acetone, cyclohexanone, acetophenone, etc.

In carrying out my invention, I may first form the partial glycerides of the maleic anhydride by causing a quantity of such anhydride to react with an excess of glycerol with the application of heat, the water being driven off as it is formed, or when the reaction is completed. In this way I obtain partial esters of glycerol and maleic anhydride in which each molecule, on the average, contains one or more OH or hydroxyl groups. I then add these partial esters to a quantity of a fusible acidic condensate of a phenol and an aldehyde, such as the fusible, soluble resin complex obtained by heating together a phenol, an aldehyde, a catalyst, such as an organic salt of a metal, and a natural resin such as rosin, and heat mixture until a highly complex mass of low acid number is produced.

In place of glycerol, polyglycerols and other polyhydric alcohols suitable for the manufacture of resinous compositions may be used. In the case of that modification of my invention wherein the partial maleic condensate is combined with a rosin-containing phenol-aldehyde resin, the latter may be produced initially in the presence of an organic or inorganic metal salt as a catalyst, preferably the acetate of zinc; the oxides and resin and fatty acid soaps of zinc, calcium, barium, strontium, manganese, lead, cobalt and of other metals, may be used. The rosin may be replaced wholly or in part by any other suitable natural resin containing a similar double bond structure.

The invention will be described in greater detail in the following examples, which are presented purely for purposes of illustration and not as indicating the limits of the invention.

*Example 1*

3 parts of maleic anhydride and 11 parts of glycerol are heated to 200° C. for about 2 hours. The reaction product is then poured into 100 parts of molten rosin, the temperature then raised to 240–250° C. and the heating continued at such temperature until the resin is substantially neutral and dissolves clear in toluol. The product is soluble also in turpentine and mineral spirits and goes readily into varnish oils. Vacuum may be applied toward the end of the heating to hasten the reaction by removing water and other volatile material.

*Example 2*

5 parts of maleic anhydride are heated with 13 parts of glycerol at about 200° C. for 2 hours. The product is then added to 100 parts of rosin and the mixture then heated at about 240–250° C. until a substantially neutral resin is obtained which is completely soluble in toluol.

*Example 3*

250 grams of a glycerol-maleic base prepared by reacting 294 grams of maleic anhydride and 478 grams of glycerol at 150° C. for 1½ hours and having an acid number of about 142 were heated with 1000 grams of rosin, the temperature being gradually raised to 240°–250° C. The heating was continued until the reaction was completed, which fact can be determined by dissolving a sample of the resin in toluol, a clear solution indicating the absence of free glycerol. The resin was soluble in varnish oils and solvents, was light in color, and was compatible with nitrocellulose lacquers, additional rosin, natural or dry-distilled ester gum and the like.

*Example 4*

| | Grams |
|---|---|
| Maleic anhydride (3 mols) | 294 |
| Glycerol (4.3 mols) | 396 |
| Butyl alcohol (1 mol) | 74 | the mixture boiling at about 150° C., were heated at such temperature under reflux. The original acid number of this mixture was 440, and after heating for about 1½ hours at 150° C. it dropped to 133. This mixture could be heated for a long time at 150° C. and after 20 hours of heating the acid number falls to 80. At any stage, this base can be reacted with rosin in a proportion of, for example, 364 parts of the base to 1000 parts of rosin, the temperature being gradually raised to 240–250° C. and held there for several hours until no more volatile matter is given off and a sample of the resin dissolves clear in toluol. Like the resins above described, the product is soluble in varnish oils, turpentine, mineral spirits and the like. The expulsion of volatile material can be hastened toward the end of the reaction by the use of vacuum.

*Example 5*

| | Grams |
|---|---|
| Maleic anhydride (3 mols) | 294 |
| Glycerol (2 mols) | 184 |
| Butyl alcohol (1 mol) | 74 | the mixture boiling at about 140° C., were heated at such temperature under reflux. The reaction proceeded quite actively at this temperature and the original acid number of about 600 dropped to about 208 in 2 hours and to 190 in about 6 hours. The product can be employed to prepare a substantially neutral resin containing any desired amount of combined maleic anhydride up to about 20% based on the weight of the rosin, by reacting the same with the calculated amount of rosin, and 10% of glycerol based on the weight of the rosin. In making, for example, a 14% resin, it is generally best to stop the reaction of the glycerol-maleic base, rosin and glycerol when the acid number has fallen to a value of 30–40 to avoid danger of gelling or impairment of solubility. In the production of a resin containing about 17% of combined maleic anhydride, the reaction should be stopped when the acid number is about 50. In the case of a 20% resin, the final acid number will generally be somewhat higher if all danger of gelling is to be avoided. The safe final acid numbers for resins of different compositions will, of course, depend to some extent upon the size of the particular batch and upon other factors well known to the chemist and can be determined by simple experiment.

*Example 6*

A phenol resin complex is produced by condensing 100 parts of rosin, 7 parts of phenol, 2 parts of zinc acetate and 17 parts formaldehyde solution (40%) by heating to about 110° C. under pressure, or under reflux, for about 12 hours. The temperature is then raised to dehydrate the mass and the latter is then heated to about 180° C. At about this temperature there is added to the phenolic complex the reaction product obtained by heating three parts of maleic anhydride and 11 parts of glycerol to 200° C. for about 2 hours. The mixture is heated at about 240–250° C. until the material is substantially neutral and dissolves clear in toluol. It is of advantage to apply vacuum toward the end of the heating to hasten the reaction by removing water and other volatile material.

*Example 7*

A fusible soluble phenolic resin complex is obtained by heating 100 parts of rosin, 10 parts of p-tertiary amyl phenol, 2 parts of zinc acetate and 14 parts of 40% formaldehyde solution under pressure to about 110° C. for about 12 hours, followed by dehydration and heating to about 180° C. To this resin there is added the reaction product obtained by heating 5 parts of maleic anhydride and 13 parts of glycerol at about 200° C. for about 2 hours. The mixture is heated at about 240–250° C. until a substantially neutral resin soluble in toluol is obtained.

*Example 8*

Same as Example 7 except that equivalent quantities of butyl phenol or cresol or mixtures of various phenols are employed in place of the amyl phenol. Where substituted phenols are employed, the p-substituted compounds are generally preferred.

*Example 9*

|  |  | Grams |
|---|---|---|
| Butyl phenol | (5½ mols) | 825 |
| Formaldehyde (40% solution) | (9.9 mols) | 743 |
| Dipentene | | 220 |
| Sodium hydroxide | dissolved in | 100 |
| | of water | 733 | are warmed together, a clear uniform solution being thereby formed. The inter-reaction of these materials is slightly exothermic. The mixture is heated at a temperature of 60 to 90° C. to effect condensation, the higher temperatures being employed for shorter periods of time. Thus at 60° C. the mixture may be heated for 5 to 10 hours, while at 90° one to two hours heating is employed, depending upon the degree of condensation desired.

The mixture, without cooling, is then treated with dilute acid, such as hydrochloric, sulphuric, acetic, etc., until all of the sodium hydroxide has been neutralized and the mixture is slightly acid. A sharp separation into definite layers takes place, the lower layer consisting mainly of a solution of sodium salt in most of the water, while the upper layer containing the resin, uncombined dipentene and some water, is separated and washed with hot water until free of acid and sodium salt. The condensate-dipentene reaction product is cloudy, but can be easily clarified and brought to a brittle condition by dehydration, as by heating to 140–150° C. This operation is smooth and presents no technical difficulties. During this heating, a large part of the dipentene is expelled, but about 10% (by weight, based on the weight of resin) is retained in the product, apparently all in chemical combination in the product. The resin can now be heated with several times its weight, for example five times, of rosin until a more or less uniform mixture is obtained, and the product then reacted with such a proportion of the reaction product of maleic anhydride and an excess of glycerol, that the final product contains from 5 to 10% of maleic anhydride in chemical combination, the excess of glycerol being preferably approximately sufficient to neutralize the free rosin in the phenolic resin mixture. The reaction is completed when the product dissolves clear in toluol, and yields a solid soluble resin of high melting point.

*Example 10*

|  |  | Grams |
|---|---|---|
| Paratertiary amyl phenol | (1 mol) | 164 |
| Formaldehyde (40% solution) | (1.8 mols) | 135 |
| Dipentene | | 46 | are mixed together and to the mixture are added gradually under stirring 40 grams (1 mol) of sodium hydroxide dissolved in 135 grams of water. The procedure outlined in Example 9 is followed, the amount of acid employed for the final precipitation of the resin being 5% in excess of that required to neutralize all of the sodium hydroxide. The dehydration is carried out up to 120–130° C. and the product contains about 10–15% dipentene, at least a large part of which appears to be chemically bound therein. The product, like that obtained in Example 9, is a clear, brittle resin which is soluble in vegetable oils and produces highly satisfactory films. The product can now be heated with several times its weight of rosin and then neutralized with a maleic anhydride-glycerol condensate, as hereinabove described.

In general, the acid-precipitated condensates of a substituted phenol and formaldehyde, prepared in the presence of a sufficient amount of basic material to keep the resin in suspension, can be employed in my present process in which such acid-precipitated condensates, following incorporation in rosin, are heated with a condensate of maleic anhydride and glycerol. While the dipentene or other normally liquid terpenic material described in Examples 9 and 10, imparts desirable characteristics to the final resin, it may be omitted either in whole or in part, the rosin and rosin ester taking over in large part the function of the dipentene. Various phenols such as cresylic acids, xylenols, the higher phenols including butyl, amyl, octyl, diisobutyl phenol, and the condensates of phenols with aliphatic or aromatic ketones, like acetone, cyclohexanone, and acetophenone, may be employed in my present process.

As already pointed out, the resins above described are suitable for the manufacture of oil varnishes and yield, for example, with wood oil, fast drying, brilliant, non-yellowing films. They are of particular advantage in nitrocellulose lacquers because of their hardness an rapid release of solvents.

Where in the claims I refer to maleic anhydride, such term is to be understood as including the acid itself as an equivalent.

The present application is a continuation in part of my allowed application Serial No. 7834, filed February 23, 1935, which in turn is a continuation in part of my application Ser. No. 467,622 filed July 12, 1930.

I claim:

1. The method of producing a soluble resin suitable for use in the manufacture of varnishes, lacquers, and other coating compositions, which comprises first reacting glycerol and maleic anhydride in the proportion of more than 1.43 mols of the former to each mol of the latter until an intermediate product of reduced acid number is obtained, and then reacting such product with rosin.

2. The method according to claim 1, in which the quantity of glycerol is substantially sufficient theoretically to neutralize the maleic anhydride and the subsequently added rosin.

3. The method of producing a soluble resin suitable for use in the manufacture of varnishes, lacquers, and other coating compositions, which comprises reacting glycerol and maleic anhydride in the presence of a monohydric aliphatic alcohol of such boiling point and in such proportions that the mixture has a boiling point of at least about 140° C. while the alcohol can be driven off at temperatures not substantially higher than about 250° C., and then reacting the product with rosin.

4. The method of producing a soluble resin suitable for use in the manufacture of varnishes, lacquers, and other coating compositions, which comprises reacting glycerol and maleic anhydride in the presence of a monohydric aliphatic alcohol of such boiling point and in such proportions that the mixture has a boiling point of at least about 140° C. while the alcohol can be driven off at temperatures not substantially higher than about 250° C. and then reacting the product with rosin and a quantity of glycerol sufficient to make the total glycerol content subtsantially equivalent to the acid content.

5. The method of producing a soluble resin suitable for use in the manufacture of varnishes, lacquers, and other coating compositions, which comprises reacting approximately equivalent proportions of glycerol and maleic anhydride in the presence of a monohydric aliphatic alcohol boiling between about 135° and 180° C. until an intermediate product of reduced acid number is obtained, and then reacting such product with rosin and an amount of glycerol approximately equivalent to the rosin until a product which dissolves clear in toluol is obtained, the weight of maleic anhydride being not substantially in excess of 20% by weight of the rosin.

6. The method of producing a soluble resin suitable for use in the manufacture of varnishes, lacquers, and other coating compoistions, which comprises reacting 3 mols of maleic anhydride with at least about 4.3 mols of glycerol at temperatures of 150-200° C. until an intermediate condensate of reduced acid number is obtained, and then reacting the condensate with an amount of rosin approximately equivalent to the excess of glycerol, the proportion of maleic anhydride to rosin by weight being under about 14%.

7. A resinous product produced in accordance with the process of claim 1.

8. A glycerol-maleic anhydride-rosin condensate soluble in varnish oils and mineral spirits, and compatible with nitrocellulose lacquers, said condensate containing from 3% to 20% of combined maleic anhydride based upon the weight of the rosin and obtained by condensing first the glycerol with maleic anhydride to the fusible resinous condition, and then reacting the condensate with rosin, the glycerol being substantially sufficient theoretically to neutralize both the maleic anhydride and rosin, and the glycerol and maleic anhydride being condensed in the presence of a liquid monohydric aliphatic alcohol when the proportion of anhydride to rosin is within the 14–20% range.

9. The process accordiing to claim 1, wherein the rosin is contained in a fusible mixture with a phenol-aldehyde condensate.

10. The process according to claim 1, wherein the rosin is contained in a resinous mixture with a condensate of formaldehyde and a hydrocarbon substituted phenol capable of forming a resinous condensate therewith, produced in the presence of sufficient aqueous alkali to keep the condensate in solution, followed by acidification and heating of the separated resin with the rosin.

11. The method of producing a soluble resin suitable for use in the manufacture of varnishes, lacquers and other coating compositions, which comprises first reacting glycerol, maleic anhydride, and a monohydric aliphatic alcohol of at least 4 carbon atoms until an intermediate product of reduced acid number is obtained, and then reacting such product with rosin.

12. The method of producing a soluble resin suitable for use in the manufacture of varnishes, lacquers, and other coating compositions, which comprises first reacting glycerol, maleic anhydride and butyl alcohol until an intermediate product of reduced acid number is obtained, and then reacting such product with rosin.

13. A nitrocellulose lacquer composition containing the fusible, soluble reaction product of (1) a fusible glycerol-maleic anhydride condensate, (2) rosin, and (3) a fusible phenol-formaldehyde resin, the quantity of combined maleic anhydride being from about 3 to about 20% by weight of the rosin.

14. A lacquer composition as defined in claim 13, wherein the phenol-formaldehyde resin is the product of the condensation of a phenol having an alkyl substituent of at least 4 carbon atoms with formaldehyde in the presence of a sufficient amount of an alkaline catalyst to keep the condensate in solution, followed by acidification and separation of the resin.

15. The method which comprises reacting the condensation product of a phenol and a aldehyde produced in the presence of a natural resin and of an organic salt of a metal of the group consisting of zinc, calcium, barium, strontium, lead, cobalt, and manganese, with a polyhydric alcohol partially esterified with maleic anhydride, the polyhydric alcohol being employed in an amount sufficient to yield an approximately neutral product.

16. The method which comprises reacting the condensation product of phenol and formaldehyde produced in the presence of rosin and of an organic salt of a metal of the group consisting of zinc, calcium, barium, strontium, lead, cobalt, and manganese, with glycerol partially esterified with maleic anhydride and thus containing free basic hydroxyl groups, the glycerol being employed in such amount that a substantially neutral resin soluble to a clear solution in toluol is obtained.

17. The method which comprises reacting the condensation product of a phenol and formaldehyde produced in the presence of rosin and of an organic salt of zinc, with glycerol partially esterified with maleic anhydride and thus containing free basic hydroxyl groups, the glycerol being employed in such amount that a substantially neutral resin soluble to a clear solution in toluol is obtained.

18. A fusible, soluble resin produce by reacting the condensate of a phenol and an aldehyde produced in the presence of a natural resin and of an organic salt of a metal of the group consisting of zinc, calcium, barium, strontium, lead, cobalt, and manganese, with glycerol partially esterified with maleic anhydride and thus containing free basic hydroxyl groups, the glycerol being employed in such amount that a substantially neutral resin soluble to a clear solution in toluol is obtained.

19. The method according to claim 15, wherein the phenol is included in the group consisting of butyl and amyl phenols.

20. The method of producing a fusible and oil-soluble phenolic resin of reduced acid number which comprises reacting approximately 100 parts of rosin, 7 parts of phenol and 17 parts of 40% formaldehyde solution, dehydrating the resinous condensate, raising the temperature to approximately 180° C., adding to the resinous material the basic hydroxyl-containing reaction product obtained by heating approximately 3 parts of maleic anhydride and 11 parts of glycerol to 200° C. for about two hours, and then heating the mixture at about 250° C. until a substantially neutral product which dissolves clear in toluol is obtained.

21. A fusible, oil-soluble resin comprising the reaction product of (1) a condensate of a phenol and formaldehyde, the phenol having a substituting alkyl group of at least four carbon atoms, (2) rosin, and (3) glycerol partially esterified with considerably less than the amount of maleic anhydride theoretically necessary to neutralize the same and thus containing free hydroxyl groups.

22. The method according to claim 15, wherein the phenol contains a substituting alkyl radical of at least four carbon atoms.

23. The method which comprises reacting the condensation product of a phenol and an aldehyde reacted in the presence of rosin, with a polyhydric alcohol partially esterified with considerably less than the amount of maleic anhydride theoretically necessary to neutralize the same and thus containing free hydroxyl groups and capable of combining with adidtional acidic material.

24. The method of producing oil-soluble phenolic resin which comprises reacting a resinous condensate of phenol and formaldehyde produced in the presence of rosin, with a smaller proportion of a free basic hydroxyl-containing partial maleic acid ester of glycerol, the amount of glycerol being sufficient to yield an approximately neutral resin.

25. The method according to claim 1, wherein the maleic anhydride is approximately 3 to about 14% by weight of the rosin, and wherein the amount of glycerol initially reacted with the maleic anhydride is approximately the theoretical quantity necessary to neutralize both such anhydride and the rosin.

26. The method of producing a soluble resin suitable for use in the manufacture of varnishes, lacquers, and other coating compositions, which comprises first reacting glycerol and maleic anhydride in the presence of a monohydric aliphatic alcohol of at least 4 carbon atoms until an intermediate product of reduced acid number is obtained, and then reacting such product with rosin, the weight of maleic anhydride being about 10-20% of that of the rosin, and the amount of the glycerol initially reacted with the maleic anhydride being approximately equivalent to both such anhydride and the rosin.

27. A soluble glycerol-maleic-rosin condensate containing about 10% to 20% of maleic anhydride calculated on the weight of the rosin and obtained by first reacting the maleic anhydride with an amount of glycerol substantially equivalent to the total amount of such anhydride and rosin, in solution in a liquid monohydric aliphatic alcohol of at least 4 carbon atoms, until a fusible condensate is obtained, and then reacting such condensate with the rosin.

28. The process according to claim 1, wherein the rosin is contained in a mixture with a condensate of formaldehyde and a hydrocarbon substituted phenol capable of forming a resinous condensate therewith.

29. A resin suitable for use with nitrocellulose lacquers and comprising the reaction product of (1) a glycerol-maleic anhydride condensate, (2) rosin and (3) a phenol-formaldehyde condensate, the weight of maleic anhydride employed being about 3 to 20% that of the rosin and the amount of glycerol being substantially sufficient theoretically to neutralize such anhydride and the rosin.

30. The reaction product of (1) a resinous, fusible condensate of a phenol and formaldehyde, (2) rosin, and (3) a condensate of maleic anhydride and glycerol in the proportion of 1 mol of the former to more than 1.43 mols of the latter.

31. The fusible, oil-soluble resin obtained by heating together a phenol-formaldehyde condensate produced in the presence of rosin, and a condensate of maleic anhydride, glycerol and a monohydric aliphatic alcohol of at least 4 carbon atoms.

ISRAEL ROSENBLUM.